United States Patent [19]

Meyer

[11] Patent Number: 4,942,609

[45] Date of Patent: Jul. 17, 1990

[54] ELECTRONIC FLYING INTEGRITY TESTER FOR DISK DRIVES

[75] Inventor: Forrest C. Meyer, Minnetonka, Minn.

[73] Assignee: Magnetic Peripherals Inc., Minnetonka, Minn.

[21] Appl. No.: 324,220

[22] Filed: Mar. 15, 1989

[51] Int. Cl.[5] .......................... G11B 5/02; G11B 27/36
[52] U.S. Cl. .......................................... 360/25; 360/31
[58] Field of Search .................................. 360/25.31; 324/210–212

[56] References Cited

U.S. PATENT DOCUMENTS

| 3,683,273 | 8/1972 | Behr et al. | 324/210 |
| 4,532,802 | 8/1985 | Yeack-Scranton et al. | 324/212 |
| 4,612,586 | 9/1986 | Sordello et al. | 360/25 |
| 4,686,563 | 8/1987 | Fountain et al. | 360/31 |
| 4,796,109 | 1/1989 | Sordello et al. | 360/31 |
| 4,829,249 | 5/1989 | Matsushita et al. | 360/31 |
| 4,847,558 | 7/1989 | Fisher et al. | 360/25 |

FOREIGN PATENT DOCUMENTS 0073180  4/1988  Japan.

Primary Examiner—Vincent P. Canney
Attorney, Agent, or Firm—Kinney & Lange

[57] ABSTRACT

The integrity of a disk drive from a flyability standpoint is tested by applying a write signal of known frequency to the read/write transducer and monitoring the playback signal from the transducer. The playback signal is processed to separate a modulation component which represents air bearing disturbance.

5 Claims, 3 Drawing Sheets

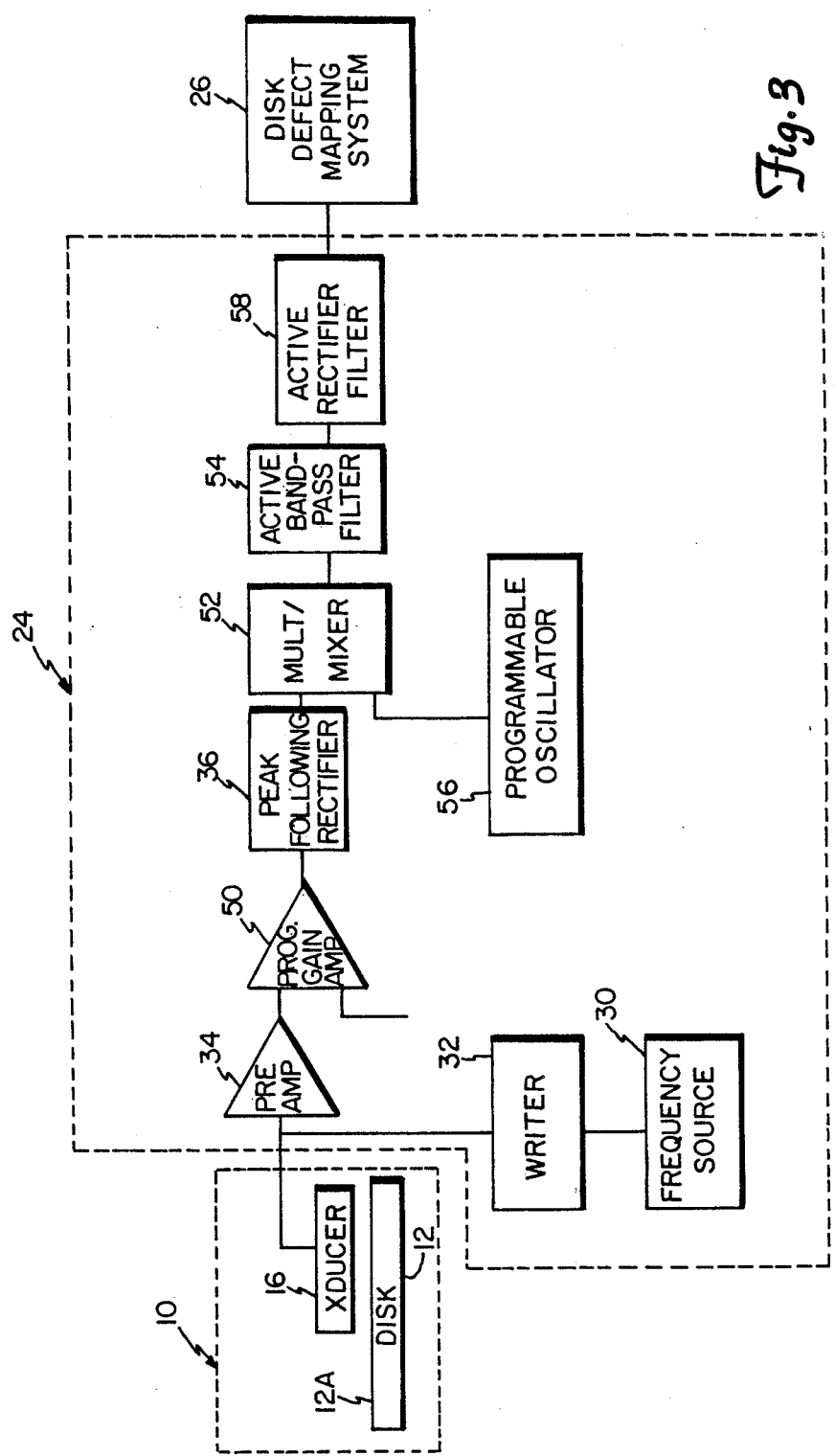

ELECTRONIC FLYING INTEGRITY TESTER FOR DISK DRIVES

BACKGROUND OF THE INVENTION

1. Field of the Invention

This invention relates to a method and apparatus for testing the rotating memory devices. More particularly, this invention relates to a method and apparatus for determining when contacts or near contacts between a read/write transducer and a memory medium of a rotating memory device occur based on the amplitude modulation of the playback signal from the read/write transducer.

2. Description of the Prior Art

In rotating memories (disk drives), the read/write transducer typically flies tenths of microns from the disk surface. Because the read/write transducer flies so close to the disk surface, it is desirable to be able to measure the smoothness of the disk surface to determine the ability of the read/write transducer to fly without touching the surface of the disk.

Identification of transducer to disk contacts or near contacts is crucial to overall disk drive reliability. Disk surface terrain is a result of manufacturing defects or contamination. The read/write transducer flies on a cushion of air (air bearing) over the disk surface. As the read/write transducer encounters a defect or dust particle on the disk surface, it will attempt to follow the air cushion and fly over a defect—subject to the mechanical response time of the transducer. If the mechanical response of the transducer is not fast enough, the read/write transducer will make contact with the imperfection on the disk surface. This results in either immediate head crash or the gradual damaging of the disk surface. The gradual damage occurs from particle spreading caused by slight impacts between transducer and the contaminate or defect.

Another failure mode occurs when a read/write transducer contacts the disk surface immediately after flying over an imperfection on the disk surface which causes a disruption in the air cushion supporting the read/write transducer. After repeated transducer-to-disk contacts, a depression in the disk surface begins to form and eventually a head crash may occur.

To ensure a reliable disk drive, it is necessary to identify disks which have topographical defects on their surface. Reliability problems are caused from defects in surface topography and not defects in magnetic material. Testing methods for reading and writing patterns to the magnetic material on the disk is of limited value because this testing indicates defects in the magnetic material and provides no information regarding the smoothness of the disk surface.

In the prior art, disk surface integrity has been measured using a separate transducer to determine if the disk surface is flat and smooth enough for a read/write transducer to fly without touching the surface. This special transducer typically includes a piezoelectric sensor for converting mechanical motion to an electrical signal.

There are several disadvantages associated with the prior art method. First, although it measures the disk surface, it does not measure the interaction of the read/write transducer with the disk surface. The actual read/write transducer is shaped differently than the special transducer, has different mechanical forces acting on it, and flies at a different height above the disk surface. Because of these differences between the special transducer and the actual read/write transducer, there is a difference in how each transducer responds to varying disk surface topography.

Second, the prior art method requires the disk drive to be unsealed so that a special transducer can be used. Unsealing the disk drive introduces the possibility of contamination of the disk surface.

Third, because a clean room is required to prevent contamination of the disks, no on-site integrity testing is possible. On-site testing is desirable for detecting damage or contamination introduced during the assembly and shipping processes.

SUMMARY OF THE INVENTION

In the present invention, disk drive integrity is measured from a flyability standpoint (i.e. the ability of the read/write transducer to fly over the disk surface without touching the disk surface). The present invention determines the disk drive integrity from the read signal frequency response of the read/write transducer after a write signal of known frequency has been written to the magnetic surface of the disk.

In the present invention a constant write signal frequency is recorded on the disk surface by the read/write transducer. The read signal from the transducer which is produced is composed of the frequency of the write signal plus a modulation signature of the air bearing frequencies. This modulation signature is the result of read/write transducer disturbances causing abrupt changes in flying height.

If the write frequency and the air bearing frequencies are spaced far apart, signal processing (such as amplitude demodulation and low pass filtering) can be used to produce an output signal representative of air bearing disturbances. Typical recording frequencies are in the megahertz range while air bearing frequencies are in the kilohertz range, allowing a simplified detection scheme for the air bearing disturbance signal.

BRIEF DESCRIPTION OF THE DRAWINGS

FIG. 3 is a block diagram of a second embodiment of the integrity tester test circuitry.

DETAILED DESCRIPTION OF THE PREFERRED EMBODIMENT

Figure 1:
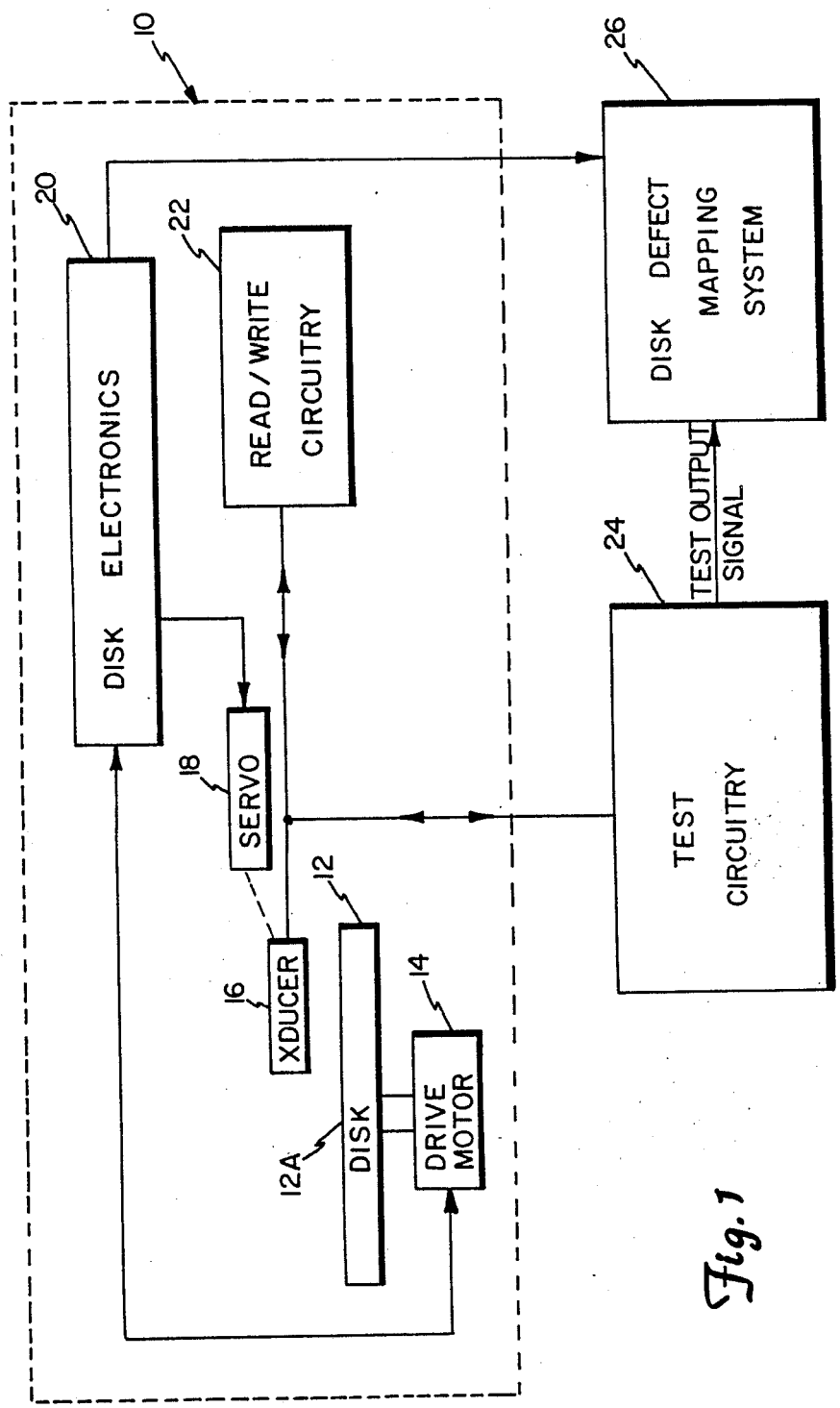
FIG. 1 is a block diagram of the disk drive system, integrity tester and defect mapping system.

FIG. 1 shows the disk drive system 10 which is comprised of a disk 12 (magnetic medium), drive motor 14, read/write transducer 16, servo 18, disk electronics 20, and read/write circuitry 22. Also shown is an integrity tester system comprising of test circuitry 24 and disk defect mapping system 26. The disk drive system 10 provides data storage and retrieval on a rotating magnetic medium (disk 12). The test circuitry 24 provides a write signal which is written to the magnetic medium 12 through the read/write transducer 16. During playback of this write signal, the test circuitry 24 detects defects in the disk surface 12A which show up as air bearing disturbances. Test circuitry 24 detects these disturbances and provides them as a test output (or disturbance) signal for the disk defect mapping system 26 which distinguishes real errors from noise and maps these errors to show where they occur physically on the disk 12.

In disk system 10, rotating magnetic medium or disk 12 is driven by drive motor 14. The surface 12A of the disk 12 is slightly roughened so as to cause air molecules next to the disk 12 to be swept at the same velocity as the disk 12. The high velocity air at the surface 12A of the disk 12 creates an air bearing for the read/write transducer 16 to float on as it is moved radially back and forth across the disk surface, 12A on a pair of rails (not shown). The movement of transducer 16 on the rails is controlled by servo mechanism 18, which positions the read/write transducer 16 to particular tracks on the magnetic disk 12. Each track is a concentric circle on the magnetic disk 12 which the servo 18 selects by moving the read/write transducer 16 back and forth along the radius of the disk 12. Both the servo 18 and drive motor 14 are controlled by the disk electronics 20. The read/write circuitry 22 converts the digital input data signal to an analog write signal which is supplied to the read/write transducer 16 for writing the information to the magnetic material on the disk 12. During the read cycle the transducer 16 magnetically picks up an analog playback or read signal from the surface 12A of the disk 12 which the read/write circuitry 22 converts to a digital read signal which can be used by a digital computer or digital signal processor (not shown).

The electronic flying integrity tester of the present invention detects defects in the disk surface 12A which disrupt the read/write transducer 16 as it floats on the air bearing. Disruptions in the flying height of the read/write transducer 16 modulate the normal read (playback) signal from the transducer 16. The test circuitry 24 detects the modulation of the normal playback signal which is within the frequency response range of the air bearing. Mechanical responses to air bearing disturbances are at a precise frequency determined by the mechanical response time of the read/write transducer 16 to disturbances. Each time the characteristic frequency of the air bearing disturbance occurs it indicates that the height of the read/write transducer 16 floating on the air bearing has been disturbed. The amplitude of the test output signal is proportional to the magnitude of the air bearing disturbance and the width of the disturbance signal is proportional to the time the disturbance lasts. This test output signal is then supplied to the disk defect mapping system 26.

The disk defect mapping system 26 performs signal processing on the test output signal (preferably in the form of software filtering) to differentiate between noise components and true defect signal components. Such signal processing includes the requirement that the defect signal occur at three out of the five adjacent tracks. A disturbance which occurs at three of the five adjacent tracks is more likely to be a result of a surface defect causing the read/write transducer 16 to be disturbed (rather than random noise). Another preferred form of processing is the requirement that a disturbance be picked up by both of the rails which support the read/write transducer 16. There typically are two rails, of which the read/write transducer is mounted on, in disk drive 10 separated by a large number of tracks. Both of these are rigidly connected and fly very close to the disk surface physically and therefore a defect disturbing one of the rails should disturb the other rail sometime later when the second rail reaches the same track which disturbed the first rail. Therefore a disturbance of either rail will disturb the transducer 16. The processing by system 26 requires a true surface defect to disturb the first rail to encounter the defect and somewhat later in time disturb the second rail. These defects are then mapped to show their physical location on the disk surface 12A so that these defects may readily be visually inspected.

Figure 2:
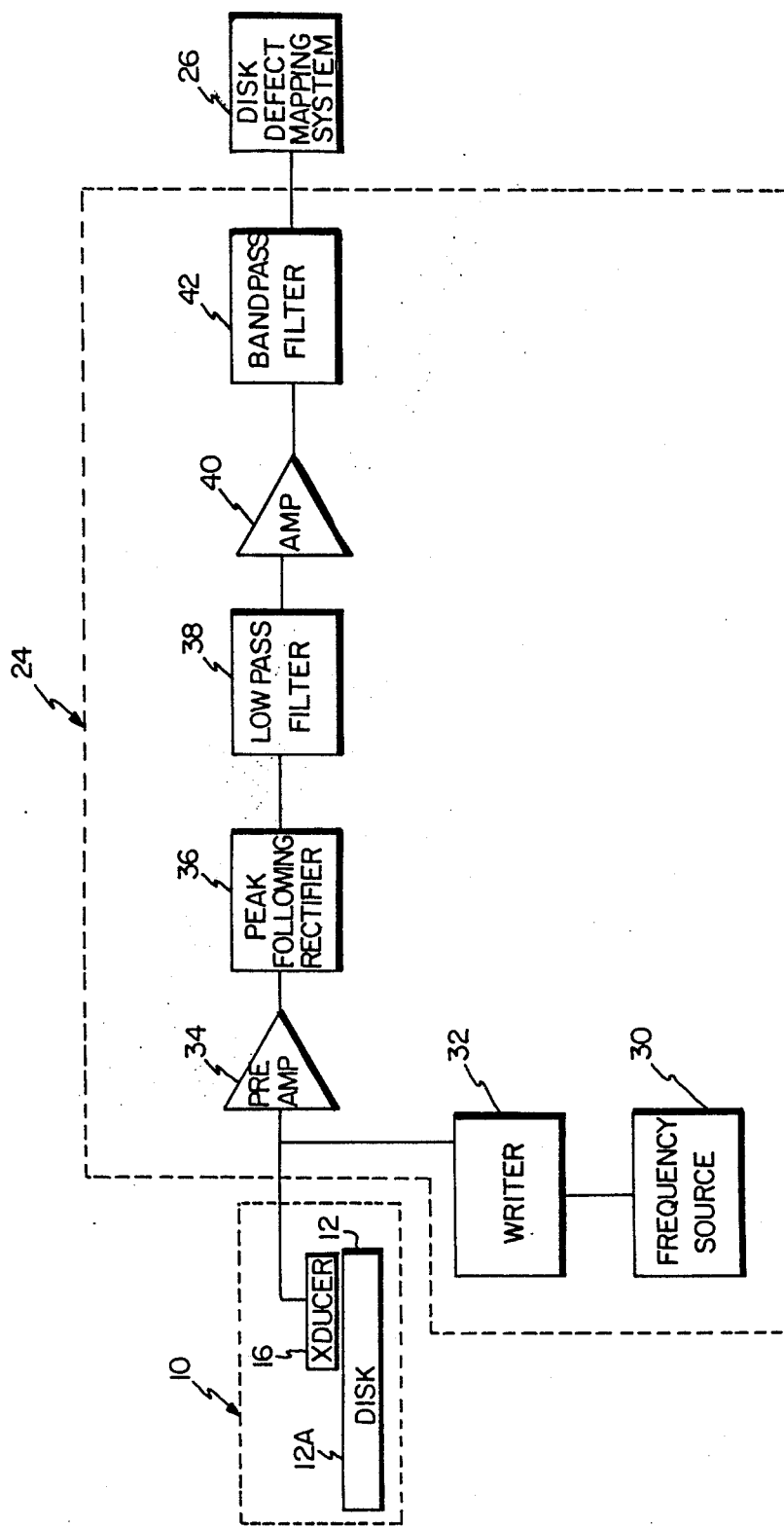
FIG. 2 is a block diagram of a first embodiment of the integrity tester test circuitry.

FIG. 2 shows a portion of disk drive 10 together with a first preferred embodiment of test circuitry 24. The test circuitry 24 consists of frequency source 30, writer 32, preamplifier 34, peak following rectifier 36, a low pass filter 38, an amplifier 40, and a bandpass filter 42. The test output signal from test circuitry 24 is supplied to the disk defect mapping system 26.

The frequency source 30, which is used in conjunction with writer 32 to write a constant frequency pattern through the read/write transducer 16, to the magnetic disk 12. The playback (read) signal containing the frequency of the recorded signal plus the modulation signature of the air bearing frequencies is amplified by preamplifier 34. The amplified playback signal is supplied to peak following rectifier 36, which separates lower frequency air bearing disturbance signals which are in the kilohertz range from the recording carrier signal which is in the megahertz range. The low pass filter 38 is used to remove the carrier signal (recorded pattern) components from the air bearing disturbance signal components. The output of filter 38 is supplied to amplifier 40, which increases the amplitude of the signal. The output of amplifier 40 is then presented to band pass filter 42, which is tuned to the air bearing frequencies. The test output signal, which is representative of the air bearing disturbance signal components is then supplied to disk defect mapping system 26.

FIG. 3 shows a block diagram of a second preferred embodiment of the test circuitry 24 allowing the tester to be used where read/write transducers 16 have varying output voltages and where the air bearing disturbance frequencies vary. There are a number of common elements from FIG. 2 which are similarly numbered in FIG. 3.

In FIG. 3, test circuitry 24 includes frequency source 30, writer 32, preamplifier 34, a programmable gain amplifier 50, a multiplier/mixer 52, a programmable oscillator 56, an active bandpass filter 54, and an active rectifier/filter 58. The programmable gain amplifier 50 is used to maintain a constant amplitude playback signal for different read/write transducers 16 having different output voltages.

Multiplier/mixer 52 translates the frequency of the air bearing disturbance signal to a new carrier frequency matching that of the active bandpass filter 54. Programmable oscillator 56 provides the difference frequency required for the translation. A carrier modulated by the air bearing disturbance signal is provided to active rectifier filter 58 which separates the air bearing disturbance signal from the carrier while filtering out the carrier signal—producing the test output signal representative of the air bearing disturbance.

The present invention provides a method of testing for defects or contamination on disk surface 12A which disturb read/write transducer 16. Disturbances of read/write transducer 16 modulate the normal playback (read) signal. Because disturbances of read/write transducer 16 are in a very narrow frequency range, these disturbance signals can be detected and used as an indicator of disk surface defects or contamination.

Because overall reliability of disk drive 10 is limited by the integrity of the disk surface 12A, the ability to determine the smoothness of disk surface 12A is very important. From a reliability standpoint it is important to identify defects in disk surface 12A because surface defects cause failures to occur later in the life cycle and therefore these failures do not show up during the post-production check-out.

Because this tester measures disturbances of the actual read/write transducer 16, it is a better indicator of defects which will cause reliability problems in the future than testing methods which use a separate special transducer for determining disk integrity. The tester of the present invention does not require the disk media to be unsealed which may introduce contamination to the disk surface. Another advantage of not having to unseal the disk media is that a clean room environment is not necessary to test the disk surface integrity. Therefore this type of testing can be performed on-site to check for damage that might have occurred to the disk media during shipping. With this type of tester, periodic on-site checking of the "health" of the disk drive is possible. Health check testing would indicate problems likely to cause future failures.

Although the present invention has been described with reference to preferred embodiments, workers skilled in the art will recognize that changes may be made and form in detail without departing from the spirit and scope of the invention.

What is claimed is:

1. An apparatus for testing operation of a rotating memory drive which includes a rotatable memory medium for storing data and a read/write transducer which is spaced by an air bearing from a surface of the rotating memory medium during operation of the rotating memory drive and which writes data into the memory medium in response to a write signal and produces a playback signal as a function of data read from the memory medium, the apparatus comprising:

means for providing the write signal to cause the read/write transducer to write data into the memory medium at a predetermined frequency; and means for deriving, from the read/write transducer playback signal, a test output signal which is representative of modulation frequencies of the playback signal due to air bearing disturbances comprising:

amplifier means for increasing amplitude of the playback signal from the read/write transducer; wherein the playback signal is composed of a higher frequency read data signal modulated by the lower frequency response of an air bearing disturbance signal;

demodulator means for separating the air bearing disturbance signal from the read data signal;

a low pass filter for separating out signals and noise having frequencies above expected frequencies of the air bearing disturbance signal; and a bandpass filter for passing only signals having the frequencies in a range of a frequency response of the air bearing.

2. An apparatus for testing operation of a rotating memory drive which includes a rotatable memory medium for storing data and a read/write transducer which is spaced by an air bearing from a surface of the rotating memory medium during operation of the rotating memory drive and which writes data into the memory medium in response to a write signal and produces a playback signal as a function of data read from the memory medium, the apparatus comprising:

means for providing the write signal to cause the read/write transducer to write data into the memory medium at a predetermined frequency; and means for deriving, from the read/write transducer playback signal, a test output signal which is representative of modulation frequencies of the playback signal due to air bearing disturbances, comprising:

amplifier means for increasing amplitude of the playback signal from the read/write transducer; wherein the playback signal is composed of a higher frequency read data signal modulated by the lower frequency response of an air bearing disturbance signal;

demodulator means for separating the air bearing disturbance signal from the read data signal;

a programmable oscillator for supplying a variable frequency source; a mixer responsive to the variable frequency source for shifting the air bearing disturbance signal in frequency; and an active filter for demodulating the air bearing disturbance signal; wherein demodulation of the disturbance signal results in separating the air bearing disturbance signal from a carrier; and wherein the active filter further removes the carrier to provide the test output signal.

3. An apparatus for testing operation of a rotating memory drive which includes a rotatable memory medium for storing data and a read/write transducer which is spaced by an air bearing from a surface of the rotating memory medium during operation of the rotating memory drive and which writes data into the memory medium in response to a write signal and produces a playback signal as a function of data read from the memory medium, the apparatus comprising:

a writer for causing the transducer to write a constant frequency pattern to the memory medium; and a preamplifier for amplifying the playback signal;

a low pass filter for removing from the playback signal a carrier frequency produced by the constant frequency pattern recorded on the memory medium; and a bandpass filter tuned to air bearing disturbance frequencies for rejecting noise to produce the test output signal.

4. A method of testing a disk drive memory device having a data storage disk and a read/write transducer, the method comprising:

writing a patter of data on the disk with the read/write transducer;

deriving from a playback signal produced by the read/write transducer a test output signal which is a function of frequency components of the modulation playback signal due to disturbances of an air bearing between the disk and the transducer;

mapping locations of defects on a surface of the disk based upon the test output signal; and the pattern is written in tracks on the disk, and wherein a defect on the surface is identified only if the test output signal indicates existence of a disturbance of the air bearing on a plurality of adjacent tracks.

5. A method of testing a disk drive memory device having a data storage disk and a read/write transducer, the method comprising:

writing a pattern of data on the disk with the read/write transducer;

deriving from a playback signal produced by the read/write transducer a test output signal which is a function of frequency components of the modulation playback signal due to disturbances of an air bearing between the disk and the transducer;

removing from the playback signal a carrier frequency produced by the pattern of data; and bandpass filtering to separate noise from frequencies in a range of a frequency range of mechnical response of the air bearing to produce the test output signal.

* * * * *